United States Patent [19]

Malina

[11] 4,448,685

[45] May 15, 1984

[54] AERATING APPARATUS UTILIZING ROTATING IMPELLER VANE

[76] Inventor: Frank Malina, 2832 S. Harding Ave., Chicago, Ill. 60629

[21] Appl. No.: 211,305

[22] Filed: Nov. 28, 1980

[51] Int. Cl.³ .............................................. B01F 3/04
[52] U.S. Cl. ................................... 210/219; 210/220; 261/87; 416/177; 415/115; 366/102
[58] Field of Search .................. 210/219, 220; 261/87, 261/93; 416/176 R, 177; 415/115; 366/101–104

[56] References Cited

U.S. PATENT DOCUMENTS

| | | | |
|---|---|---|---|
| 2,044,331 | 6/1936 | Rogers | 261/87 |
| 4,066,722 | 1/1978 | Pietruszewski et al. | 261/87 |
| 4,200,597 | 4/1980 | Baum | 261/87 |
| 4,240,990 | 12/1980 | Inhofer et al. | 261/87 |

*Primary Examiner*—David R. Sadowski
*Attorney, Agent, or Firm*—Balogh, Osann, Kramer, Dvorak, Genova & Traub

[57] ABSTRACT

An apparatus for aerating a body of stagnant water to neutralize the pollutants therein. The apparatus draws fresh ambient air above the surface of the water and forcibly disburses the air under the surface into the body of water for oxidation purposes. The apparatus comprises a hollow rotatable cylindrical casing provided with a helical vane mounted on one end of the casing. A series of holes in the casing wall adjacent the vane creates regions of sub-atmospheric pressure in the vicinity of the holes when the cylinder is rotating; thus drawing air from the interior of the casing and, by a scooping action, forcing the air generally radially outwardly and below the surface of and into the body of water. The cylinder is driven by a motor. The helical vanes may be formed of torroidal disc or washer that is cut and spread apart axially and secured to cylindrical casing. The apparatus also displays improved means of conveying fluids by helient conveyor when the blades of helient screw are inclined at an angle acute the normal to the longitudinal axis of the helical screw.

7 Claims, 7 Drawing Figures

AERATING APPARATUS UTILIZING ROTATING IMPELLER VANE

The improved aerating apparatus comprising the present invention has been designed for use primarily in connection with the treatment of natural outdoor bodies or ponds of stagnant water such as are frequently found in farming communities, and in the vicinity of which cattle, sheep and the like are allowed to graze. Due to the infiltration of animal waste, such ponds frequently become polluted and thus present an obnoxious odor to the adjacent countryside.

In an effort to alleviate such a situation, it has been the practice in some instances to treat the pond with deodorizing or neutralizing chemicals. However, such a remedy is employed only when the extent of pollution is slight and can be neutralized with the use of extremely mild chemicals in small quantity so as to avoid the danger of rendering the water poisonous for livestock. Furthermore, the uniform distribution of chemicals throughout the entire pond presents a problem, particularly if the pond is large. Still further, this practice requires the frequent testing of the water content and a knowledge of the chemistry involved. In other instances, it has been the practice to install expensive underground equipment for aerating the pond, including the use of underground pipes, compressors, aerating nozzles and pumping facilities of a permanent nature for supplying air to the pond through such pipes and nozzles.

The present invention is designed to overcome the above-noted limitations that are attendant upon the treatment of stagnant and polluted bodies of water and, toward this end, the invention contemplates the provision of a relatively portable aerating apparatus which may conveniently be mounted adjacent the shoreline of the pond and set into operation for a period of time until the pollution has been remedied, after which it may be removed and transported to storage without major disassembly problems.

More specifically, the invention embodies a motor driven rotatable cylindrical hollow casing intended to be submerged below surface of the pond. The casing is provided with one or more helical vanes at its outer end. There are a series of holes or openings in the casing wall adjacent the helical vanes. The hollow casing is driven by a hollow drive shaft connected to a motor. The upper end of the drive shaft contains air inlet holes or openings for sucking in air from above the pond surface. When the vanes rotate they throw water outwardly and axially and this creates a region of low or sub-atmospheric pressure in the vicinity of the holes. This draws air from the interior of the casing and pushes air into the surrounding water.

Among the important features of the present invention are the particular nature of the helical vanes, their positional relationship with respect to the air outlet holes, and the method by means of which they are fashioned and installed on the pump casing. Insofar as such method is concerned, a full description thereof will be made subsequently when the nature of the helical vanes is better understood, it being deemed sufficient for the present to state that by the use of such method, the vanes may be constructed and mounted on the pump casing simultaneously and with comparative facility.

The provision of an aerating apparatus such as has briefly been outlined above, and possessing the stated advantages, and the provision of the yet-to-be-described method constitute the principal objects of the present invention. Other objects and advantages, not at this time enumerated, will become readily apparent as the following description ensues.

In the accompanying single sheet of drawings forming a part of this specification, one illustrative embodiment of the invention has been shown.

Figure 1:
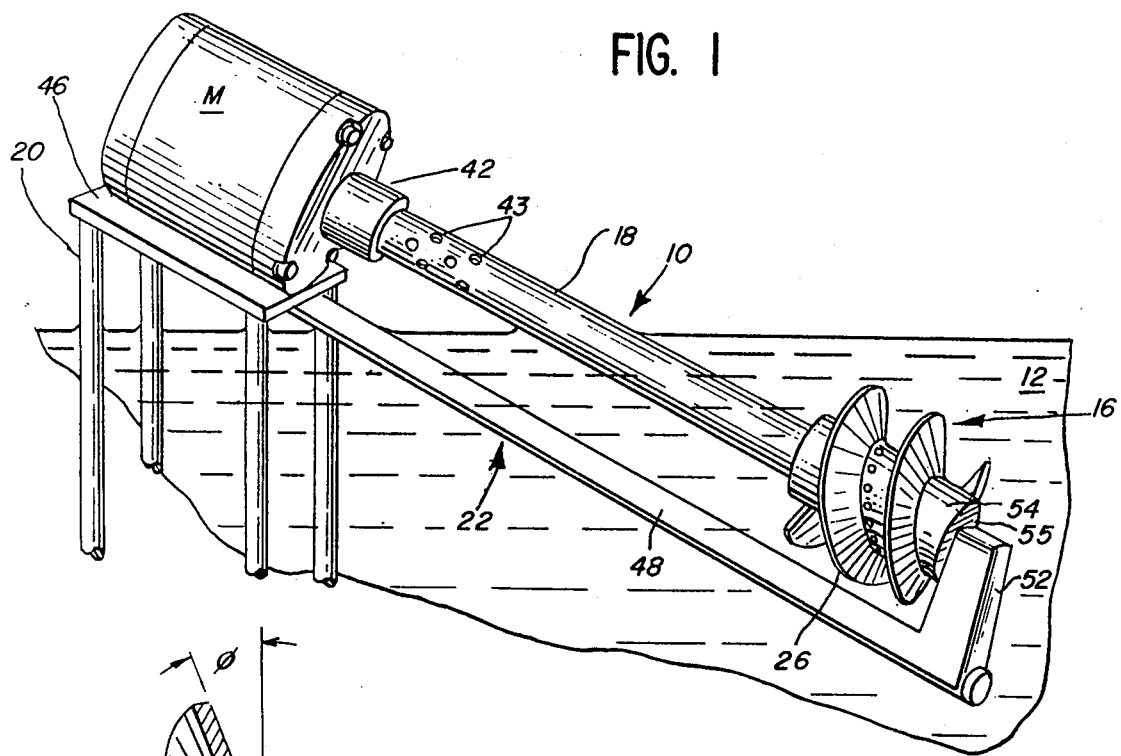
FIG. 1 is a fragmentary perspective view of an outdoor pool or body of stagnant water, showing the improved aerating apparatus operatively mounted in relation thereto.

Referring now to the drawings in detail, and in particular to FIG. 1, an aerating apparatus constructed according to the present invention is designated in its entirety by the reference numeral 10, and it is shown as being land-mounted adjacent to and in operative association with an outdoor body or pond 12 of stagnant water which it is desired to aerate and thus oxidize or otherwise de-vegitate or oxidize the pollutants associated therewith and render the same less noxious.

The apparatus involves in its general organization an elongated assembly including an aerator pump proper 16 and a tubular air inlet extension 18 which also constitutes a drive tube for the pump proper, an electric motor M for driving the assembly, a support 20 for the motor M, and an optional outrigger support 22 for the distal or outer end of the assembly.

The assembly is in the form of an elongated hollow cylindrical tubular body, one end of which is provided with an enlarged diameter portion 54 (FIGS. 1 and 4) which constitutes the pump proper 16 and the remainder of which constitutes the air inlet extension drive 18. The nature of the assembly will be described in detail presently but, for the present, it is deemed sufficient to state that when the pump proper 16 is submerged in a body of water with the extension 18 projecting above the water level so that its proximate end lies outside the body of water, rotation of the assembly about its longitudinal axis will effect the desired aeration of the body of water. Such aeration is accomplished by providing a series of air outlet openings or holes 24 in the cylindrical wall of the pump casing and providing a means whereby, upon rotation of the unit, a region or zone of sub-atmospheric pressure will be created. The holes are positioned in that region. The interior of the pump casing will be at least partially vacuumized, thereby drawing air through the inlet extension or drive tube 18 and forcibly distributing the same into the surrounding water through the air outlet holes 24. Such means by which this is accomplished is in the form of a vane arrangement 26 which is mounted on the pump casing exteriorly thereof and in the immediate vicinity of the holes 24 and which, during rotation of the aerator 16, impels water generally radially outwardly in all directions and axially, away from the cylindrical pump casing and thus continuously draws ambient air into the proximate end region of the air inlet extension and expels a large volume of air into the body of water through the air outlet holes 24.

Still referring to FIG. 1, there is disclosed in this view a typical outdoor installation wherein the apparatus 10 is employed for treating a standing pond or body of water 12 which typically may be one to which cattle have access and which has become polluted with organic wastes. The inner or proximate end of the pump extension is operatively connected to and is supported by the drive shaft of the motor M and it is coupled thereto by means of a stepped collar 42. A series of radial air inlet holes 43 are provided in the wall of the tube near collar 42 to admit air to the interior of the tube 18 for subsequent discharge from the air outlet holes 24 as previously described.

The motor support 20 may be any appropriate permanent or temporary structure to which the motor M is removably bolted. The aforementioned outrigger support 22 is in the form of an elongated beam 48, the proximate end of which is secured to the underneath side of the motor foot plate 46, while the distal end thereof has mounted thereon an upstanding journal block 52 which supports for rotation the extreme distal end of the assembly by means of a journal pin 51 which projects into the block 52.

The outrigger support is optional, and serves to prevent undue vibration of the assembly. It has been found that with proper balance, vibration is eliminated and the outrigger support may be omitted.

The entire assembly is intended to be mounted at an appropriate angle, downwardly into the pond of water in a position that the air-water discharge from the vanes does not agitate the muddy bottom of the pond.

Considering the aerator pump unit 16 in greater detail, the enlarged diameter portion of the pump unit which, as previously described, constitutes the pump proper 16, is provided with a cylindrical wall 54 and a forward circular end wall 55. The aforementioned air outlet holes 24 are formed in the wall 54 and they are disposed in a helical row which is arranged adjacent the vane 26. If two vanes are used, the outlet holes will be arranged in nested relationship 180° apart on opposite sides of the wall 54.

Figure 4:
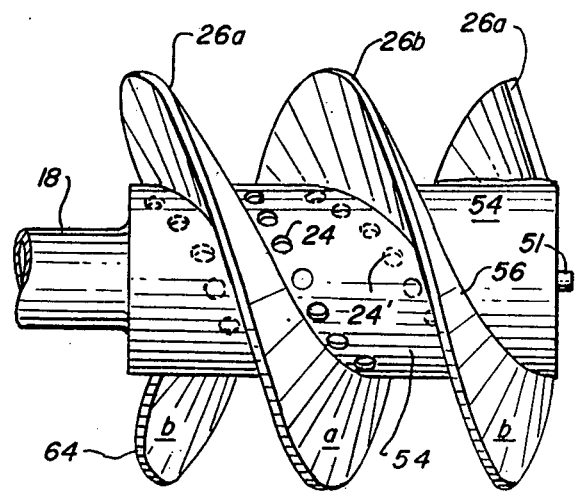
FIG. 4 is an enlarged side elevational view of the distal or right hand end portion of the aerator pump unit.

In the drawings, FIG. 4, there are two vanes 26 which are referred to as 26a and 26b. The direction of rotation of the aerator pump unit 16 is shown by the curved arrow in FIG. 1 and it will be noted that the helical vanes 26a and 26b are inclined throughout their entire lengths outwardly, i.e. toward the inner or proximal end of the assembly at an acute angle of approximately 15° from a 90° transverse plane passing through the unit. The angle $\theta$ shown in FIG. 2 can be between 1 and 45 degrees for effective operation of the invention. The inner edges 56 of the vanes 26a and 26b are continuously secured or welded to the cylindrical wall 54 of the pump casing 54 along helix lines which follow the contour of the rows of air outlet holes 24 and which are spaced from such rows by a slight distance, considering the direction of rotation of the pump casing.

Figures 2, 5, 6, 7:
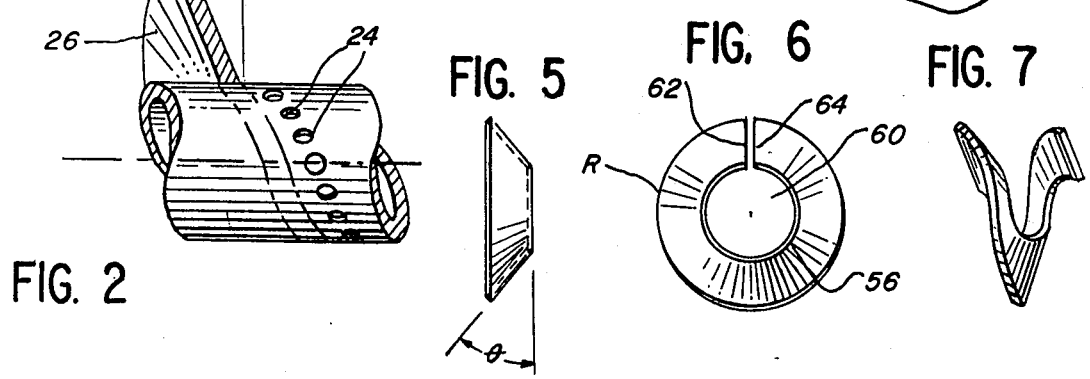
FIG. 2 is an enlarged fragmentary side elevational view of a limited portion of a rotary aerator pump unit employed in connection with the present invention with one of the pump vanes broken away in the interests of clarity.
FIG. 5 is a greatly reduced side view of a sheet metal-coned split ring or Belleville washer which constitutes a blank from which the helical water-impelling vanes that are employed in connection with the present invention are fashioned.
FIG. 6 is a front elevational view of the blank of FIG. 5 showing the vane during its progressive stage of fashioning.
FIG. 7 is a side elevational view of the fully fashioned vane in its free state.
Figure 3:
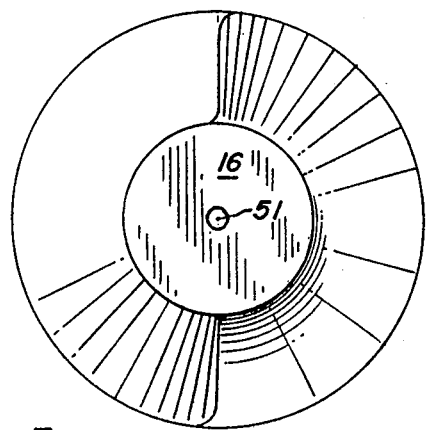
FIG. 3 is an enlarged right hand end view of the pump unit shown in FIG. 1 with the end support therefor omitted in the interests of clarity.

According to FIG. 4, air outlet holes or openings 24' are arranged in helical rows adjacent to the point where the inner edges of the blades or vanes 26a and 26b are secured to the cylindrical wall of the pump casing 54. The blades or vanes 26a and 26b, respectively, are inclined toward the opposite proximate or inner end of the assembly at an acute angle $\theta$ with respect to the normal to the longitudinal axis of the assembly. Accordingly, the blades or vanes 26a and 26b are secured to the cylindrical wall 54 along the helical rows of air outlet holes or openings 24' so that the inclined blades overlap the helical rows of air outlet openings 24'. Furthermore (as shown in FIGS. 4–6), the outer edges of the helical vanes or blades (26a, 26b) have throughout their entire length, the same outside diameter.

As previously indicated, the vanes 26a and 26b are inclined relative to the longitudinal axis of the assembly and the net result of such inclination is that as each air outlet hole 24 travels in a circular path within the body of water 12, the adjacent trailing increment or segment of the vane 26 associated therewith tends to scoop, so to speak, water away from the surface of the cylindrical pump wall 54, thus flinging it radially outwardly and creating a region of low pressure in the immediate vicinity of the hole. Since such pressure is sub-atmospheric, and since a large number of holes 24 are involved, air will be drawn through all such holes, thereby vacuumizing the interior of the pump proper and drawing air into the tubular extension or drive tube 18 through the air inlet holes 43 as previously described.

The linear helical extent of the vanes 26a and 26b and the number of helix turns employed for each vane may be varied but, for facility of assembly of the vanes on the cylindrical wall 54 of the pump casing as will be described presently, each vane 26 is comprised of substantially one helix turn, a single turn being adequate for effective aeration of the water. In the drawings there are two helical rows of air outlet holes 24 with the rows being nested, so to speak, relative to each other in opposed relationship on opposite sides of pump wall 54, the longitudinal extent of the pump casing need not be great and thus both of the vanes 26 and their associated outlet holes 24 may be positioned close to the distal end of the inclined assembly where they are maintained an appreciable and effective distance below the surface of the water in the pond 12.

By utilizing vanes 26 which, when assembled on the cylindrical pump casing wall 54, establish substantially one helix turn for each vane, and which in no case exceeds of full 360° turn, a relatively simple and extremely efficient method of vane assembly is made possible. Such a method constitutes an important feature of the present invention. It avoids the costly process of fabricating propeller or rotor blades.

Each vane 26a and 26b, as the case may be, is formed from a circular radially split coned or tapered washer-like sheet metal ring or blank such as is shown in FIG. 5 on a reduced scale and designated at R. The ring R is provided with a central circular opening 60 having a diameter equal to the outside diameter of the wall 54 of the pump casing. The edge 56 of the opening 60 becomes the inside edge of the completed vane 26 and therefore it is similarly designated.

The development of the vane 24 in its free state from the split ring R can be accomplished in a cylindrical forming mandrel, in the form of a conventional two-part die. Alternatively, the vane can be formed without a forming die whereby the cylindrical wall 54 of the pump casing is employed in the manner of a mandrel and, with the flat vane-forming ring R tightly received about the wall 54, the split ends 62 and 64 of the ring R (which become the end edges of the vane 26) are forced apart in opposite directions longitudinally along the wall 54 until the ring assumes the shape of the completed vane 26.

The inside edge 56 of the ring tends to forcibly hug the wall 54 of the pump casing as it slides along the surface thereof, while at the same time the sheet metal of the ring progressively and automatically assumes a certain amount of slant or tilt shown in FIG. 2 without requiring any external force other than that which is inherently applied to it as the split ends of the ring are forcibly spread apart. Stated otherwise, the desired tilt angle is, to some extent, attained partially by longitudinally spreading the split ends 62 and 64 of the ring apart while the inside edge of the ring continues to hug the outer surface of the cylindrical wall 54. Although it is possible that the flat sheet metal of the ring R may tilt in either direction during the stretching operation just described, if, at the commencement of the stretching operation, a slight impetus is imparted to the metal, it will continue to lean or tilt in the desired proper direction. When the ring R which is preferrably of heavy sheet metal, has attained the desired inclination as well as the desired longitudinal extent, the inside edge 56 may be welded in position on the cylindrical wall 54 and the assembly of the vane 26 will be complete.

For purpose of balance, two oppositely disposed vanes are secured to the cylindrical wall 54. Since two vanes are employed and arranged 180° apart on the wall 54, the assembly is effected by placing two of the split rings R on the wall 54 and then interlocking them in chain link fashion by opening up the slit 62 in either or both of the rings. Thereafter, the rings may be stretched in the manner described above, either successively or simultaneously, care being taken to maintain the rings in their opposed 180° relationship on opposite sides of the wall 54 which, as aforesaid, is employed as a mandrel to assist in the stretching operation. When the inside edges 56 are welded in position on the wall 54, the assembly is complete.

From the above description it is believed that the nature and functioning of the aerating apparatus 10 will be fully understood and that the efficiency of the method by means of which it is constructed will be appreciated.

The invention is not to be limited to the exact arrangement of parts shown in the accompanying drawings or described in this specification as various changes in the details of construction may be resorted to without departing from the scope of the invention. For example, although the invention has been described in connection with the treatment of natural outdoor bodies or ponds of stagnant water, it is contemplated that the aeration apparatus 10 may, with or without modification as required, be employed for the purification of swimming pools, whether outdoors or indoors. In such an instance it may be found expedient to dispense with the entire outrigger support by journalling the distal end of assembly on a far wall of the pool. Alternatively, if the assembly is sufficiently short, the distal end thereof will require no support whatsoever. Additionally, if an increase in cost is not a factor, the vanes 26a and 26b may be individually fashioned on a mandrel and then subsequently applied to the cylindrical wall 54 of the pump casing, or they may be individually fashioned in suitable forming or pressing dies and subsequently removed therefrom, slipped over the wall 54 endwise, and finally welded in position along their inner edges 56. Therefore, only insofar as the invention has particularly been pointed out in the accompanying claims is the same to be limited.

The disclosed apparatus also illustrates that efficient and effective conveying of fluids, whether liquid or granular form, can be obtained by means of a rotating helical screw, if the blades of the helix are pitched or canted at an angle, preferably 15 degrees, but with varying degrees of effectiveness, from 1 degree to 45 degrees, with respect to the normal to the concentric axis of rotation of the helix.

I claim:

1. Apparatus for aerating an unclean body of water comprising:
   a hollow cylindrical casing including means for rotation at a substantially high speed, one end of said cylindrical casing being provided with an enlarged diameter portion having a cylindrical wall and which is submerged beneath the surface of the body of water, and an opposite end of said cylindrical casing disposed above the surface of the body of water,
   said cylindrical wall being formed with a plurality of air outlet openings arranged therein in a helical row,
   water impelling vane means secured to said cylindrical wall of said enlarged diameter portion for submersion beneath the surface of the body of water,
   said vane means comprise at least one helical blade including one helix turn and having its inner edge continuously secured to said cylindrical wall along helix lines which follow the contour of said helical row of air outlet openings and which is spaced from such row by a slight distance,
   said at least one helical blade being inclined throughout its entire length toward the opposite end of said cylindrical casing, at an acute angle with respect to the normal to the longitudinal axis of said cylindrical casing, and overlapping said row of air outlet openings,
   the inner edge of said at least one helical blade having a diameter equal to the outside diameter of said cylindrical wall of said enlarged diameter portion, and the outer edge of said at least one helical blade having throughout its entire length the same outside diameter thereof, and
   air inlet means disposed at the opposite end of said cylindrical casing for admitting air to the interior of said cylindrical casing for subsequent discharge through said air outlet openings.

2. Apparatus as claimed in claim 2 wherein said vane means comprises one or more helical blades inclined throughout its length at an angle of 15° to the longitudinal axis of the casing.

3. Apparatus as claimed in claim 1 wherein the angle of inclination of said helical blade is between 1° and 45°.

4. Apparatus as claimed in claim 1 comprising:
   motor means for rotatably driving said cylindrical casing.

5. Apparatus as claimed in claim 4 comprising a mounting base for said motor means and an outrigger support secured to said mounting base extending to the outer edge of said cylindrical casing to provide a journal support therefor.

6. Apparatus as claimed in claim 1, further comprising motor means for rotatably driving said cylindrical case, and wherein said vane means are inclined in a direction toward the motor means.

7. Apparatus as claimed in claim 1, wherein said vane means comprise:

two helical blades, each including one helical turn, and disposed 180° apart on opposite sides of said cylindrical wall, and said plurality of air outlet openings arranged in two helical rows nested relative to each other in an opposed relationship on opposite sides of said cylindrical wall, the inner edges of said blades being continuously secured to said cylindrical wall along helix lines which follow the contour of the rows of air outlet openings, and which are spaced from such rows by a slight distance, said two helical blades being inclined throughout their entire length toward the opposite end of said cylindrical casing at an acute angle relative to the longitudinal axis of said casing, and overlapping said helical rows of air outlet openings respectively, the inner edges of said blades having a diameter equal to the outside diameter of said cylindrical wall of said enlarged diameter portion, and the outer edges of said blades having throughout their entire length the same outside diameter of their respective blade.

* * * * *